UNITED STATES PATENT OFFICE.

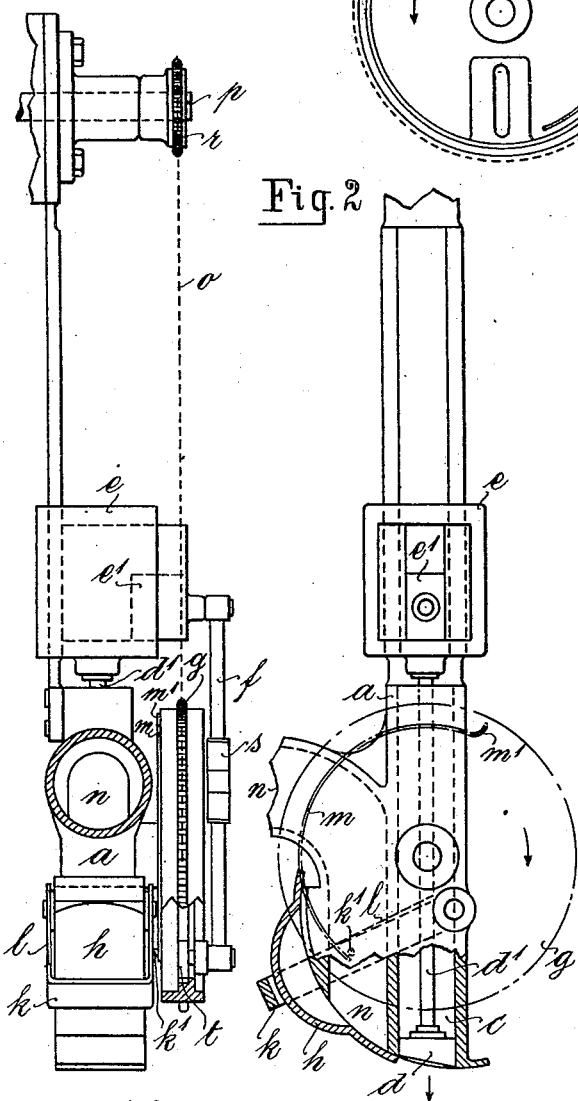

HERMANN FREHRS, OF LÜBECK, GERMANY.

FORCE-PUMP.

1,258,207.          Specification of Letters Patent.       Patented Mar. 5, 1918.

Application filed August 17, 1917. Serial No. 186,737.

*To all whom it may concern:*

Be it known that I, HERMANN FREHRS, subject of the German Emperor, residing at 18 Lindenstrasse, Lübeck, Germany, have invented certain new and useful Improvements in Force-Pumps, of which the following is a specification, reference being had therein to the accompanying drawing.

Pumps have heretofore been devised for forcing off desired quantities of thick fluid masses by means of a piston by which they are sucked in and pushed out. A turnable hollow valve is employed and the piston does not reach to the entry and egress points of the masses, but there exists between the mass and the piston an air vacuum, which is injurious to the working of the pump.

The present invention is designed as an improvement in this class of devices and embodies under the cylinder and the sucking-off-channel a compulsory running moving valve which at certain intervals connects the supply reservoir with the cylinder at such point where the piston changes its stroke and goes over on the sucking movement.

The invention is clearly illustrated in the accompanying drawing, which, with the letters of reference marked thereon, form a part of this specification, and in which—

Figure 1 is a back view with parts in section.

Fig. 2 is a side view with parts broken away and portions in section.

Fig. 3 is a side view with the parts in a different position.

Fig. 4 is a side view of the driving chain wheel removed.

Like letters of reference indicate like parts throughout the different views.

Referring to the drawings, $a$ is a casing provided with a flange $b$ by which it is tightly connected with a supply reservoir and carries the cylinder $c$, in which latter is a piston $d$, of which $d'$ is the stem. This stem is connected with the slide $e$ which, in turn, is connected with the sliding piece $e'$ by an adjustable pitman $f$ which is rendered adjustable by a turn buckle or the like $s$. $g$ is a chain wheel rotatably mounted on the casing $a$ and connected by chain $o$ is a chain wheel $r$ carried by the roller $p$.

$h$ is a valve so mounted that in the closing position communication is made between the sucking-off-channel and the cylinder. This valve is mounted on the casing $a$ and is held by a handle $k$ controlled by a spring $l$ and carrying a plug $k'$, $m$ being a curved member formed as a partial circular bow and carried by the chain wheel.

$n$ represents a channel communicating with the cylinder $c$.

In operation, the roller $p$ and the chain wheel $g$ are operated through the medium of the chain $o$ and through the medium of the pitman $f$ the slide $e$ is moved and simultaneously therewith the piston $d$ is moved in the cylinder $c$. In the lower position of the piston, the curve $m$ slides off the plug $k$ and the slide valve is moved, so that by the movement of the valve $h$, a connection between the channel $n$ and the cylinder $c$ is provided. The mass under pressure to be pumped now passes from the supply reservoir through the channel $n$ to the cylinder $c$ at the moment the piston changes from its pushing stroke into its sucking movement, so that the mass is only sucked into the cylinder $c$ by the piston $d$. When the piston has reached its uppermost stroke, the curve $m$ runs with its point against the plug $k'$ of the handle $k$ and swings the same so that the valve $h$ of the lower opening of the cylinder $c$ is moved away from the lower opening of the cylinder $c$. During this movement the piston $d$ remains stationary. In order to permit this, the pitman $f$ rests on the sliding piece $e'$ without actuating the slide $e$, but after the crossing of the dead point the sliding piece $e'$ first slides in the slide $e$, the slide itself and the piston then remaining still, but in the meantime until the catching of the sliding piece $e'$ on the slide $e$ the valve $h$ reaches its open position for the cylinder $c$ and closes communication between the cylinder $c$ and the supply reservoir. So long as the curve $m$ under the plug $k'$ continues, that is, so long as the piston moves on its downward stroke and thereby carries the mass out of the cylinder $c$, the open position of the valve is retained as the valve with the plug is supported on the curve. As soon as the end of the curve $m$ passes the plug $k'$, the support of the handle $k$ is lifted and by the action of the spring $l$ is moved back into the position so that connection is afforded between the supply reservoir and the cylinder. Also during this backward movement of the valve the piston $d$ remains stationary.

The quantity pumped may be regulated by changing the length of the pitman $f$ by the nut or turn buckle $s$. The nut $t$ on the chain wheel permits of ready displacement of this pitman.

When the cylinder c has been filled with the mass, a vessel of any kind can be placed thereunder and after it has been filled it can be easily replaced by another.

The device can be readily arranged so that said cylinders can be fed out of one supply reservoir.

Modifications may be resorted to and still be within the scope of the invention so long as the mass is discharged into the cylinder without air space between the piston and the mass.

What is claimed as new is:—

A force pump comprising in combination, a supply reservoir, a cylinder, a piston, and a valve movable in the arc of a circle so that in one direction of its movement connection is made between the reservoir and cylinder and in the opposite direction the reservoir is closed and the end of the cylinder freely open and means actuating said valve and piston whereby said piston is advanced to the end of the cylinder when the reservoir is closed and the end of the cylinder freely open.

In testimony whereof I affix my signature in the presence of two witnesses.

HERMANN FREHRS.

Witnesses:
WILH. GRAEFEL,
FRANCISCO GOZALBES.